April 22, 1952 — O. R. HEAVILIN — 2,593,880
PORTABLE EARTH LEVELING APPARATUS
Filed Sept. 10, 1947 — 4 Sheets-Sheet 1

Inventor

Oral R. Heavilin

By Clarence A. O'Brien and Harvey B. Jacobson
Attorneys

Inventor
Oral R. Heavilin

April 22, 1952 — O. R. HEAVILIN — 2,593,880
PORTABLE EARTH LEVELING APPARATUS
Filed Sept. 10, 1947 — 4 Sheets-Sheet 3
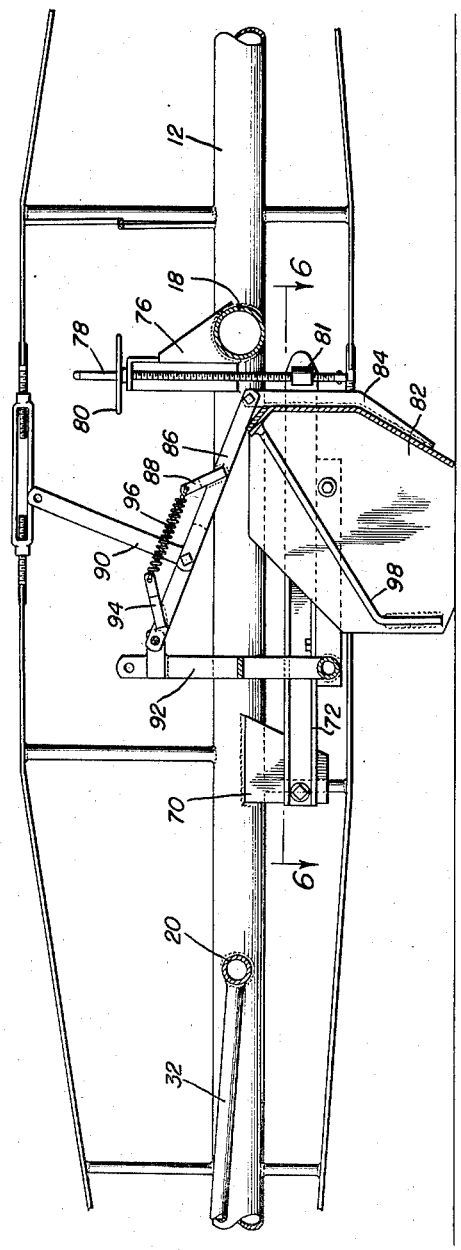
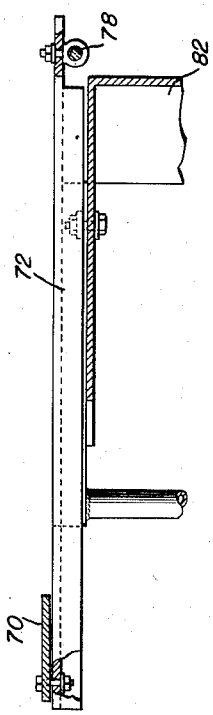
Inventor
Oral R. Heavilin

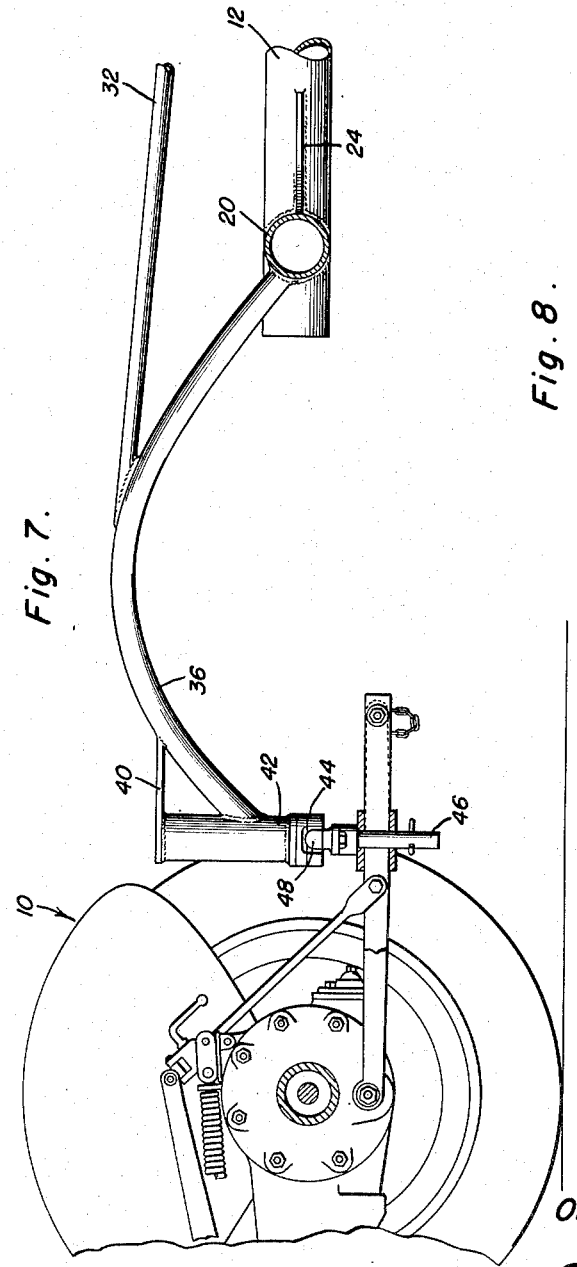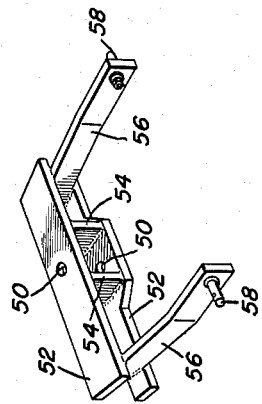

Patented Apr. 22, 1952

2,593,880

UNITED STATES PATENT OFFICE 2,593,880

PORTABLE EARTH LEVELING APPARATUS

Oral R. Heavilin, Klamath Falls, Oreg.

Application September 10, 1947, Serial No. 773,117

2 Claims. (Cl. 37—169)

This invention appertains to novel and useful improvements in farm implements, particularly those adapted to be secured to and drawn by a vehicle.

The general purpose of this invention is to level terrain and farm land prior to certain other agricultural operations.

Another object of this invention is to provide an improved frame structure for seating a ground leveling means therebetween.

Another purpose of this invention is to provide a device of the nature to be described with castors at one end of the said frame, the other end of the said frame engageable swivelly with the draw bar of a conventional tractor so that a part of the weight of the device is supported by the tractor.

Ancillary objects and features of novelty will become apparent to those skilled in the art, in following the description of the preferred form of the present invention, illustrated in the accompanying drawings, wherein:

Figure 5 is a fragmentary sectional view of the invention shown in Figure 2 and taken substantially on the line 5—5 thereof and in the direction of the arrows;

Figure 6 is a fragmentary sectional view illustrating details of construction of the invention;

Figure 7 is a fragmentary sectional view illustrating particularly the swivel means for securing the invention to a tractor, and Figure 8 is a perspective view of a portion of the securing means utilized in attaching the invention to a conventional tractor draw bar.

Figure 1:
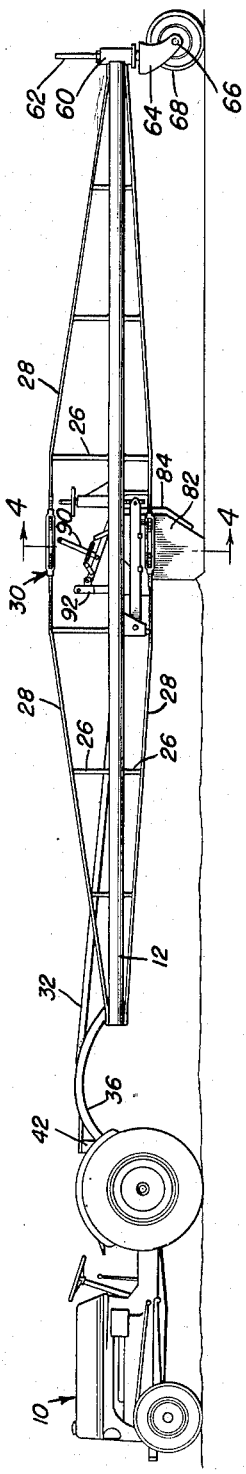
Figure 1 is an elevational side view of the preferred form of the invention, illustrating the same in conjunction with a conventional tractor.
Figure 2:
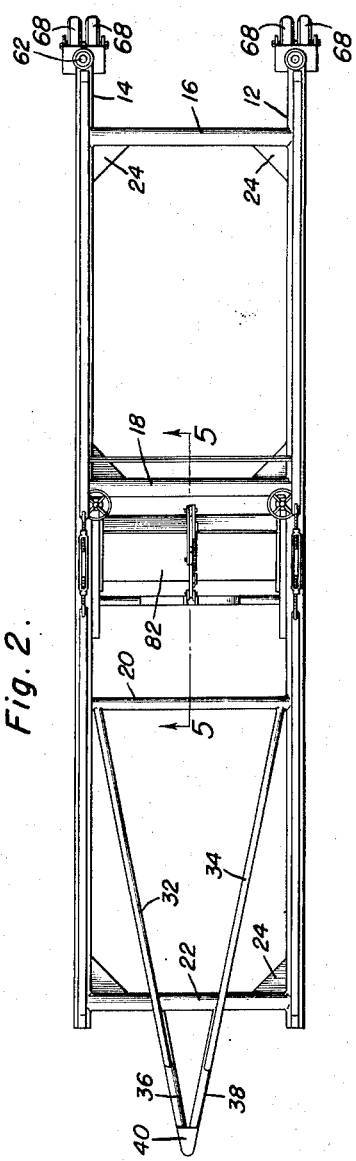
Figure 2 is a plan view of the invention disclosed in Figure 1.
Figure 3:
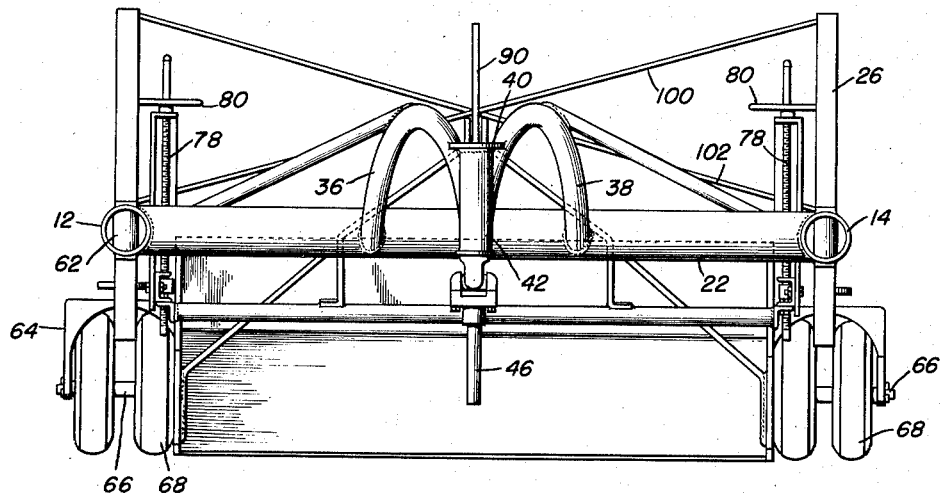
Figure 3 is a front end view of the preferred form of the invention.

A tractor generally indicated at 10, is provided for illustrative purposes. A frame member is utilized in conjunction with the present invention and forms a material portion thereof. This frame member is composed of a pair of substantially parallel spaced rods 12 and 14 respectively which may be tubing or the like. The preferential material of construction is metal. Tie rods 16, 18, 20 and 22 respectively extend across the said rods 12 and 14 for the purpose of retaining the rods 12 and 14 in the proper fixed position. The said tie rods may be welded, or otherwise joined in order to maintain a rigid connection. Of course, gusset plates 24 may be supplied at advantageous positions to further assist in rendering the frame substantially rigid. Trusses are formed on each of the said rods 12 and 14.

These trusses are vertical and are composed of a plurality of substantially perpendicular arms 26 both above and below each of the said rods 12 and 14.

Forming a portion of the said trusses is a plurality of brace members 28 attached together through the medium of turnbuckles 30. Of course, this renders the brace members adjustable.

Extending from the tie rod 20 is a pair of links 32 and 34 respectively which are in turn welded or otherwise secured to a pair of arcuate converging members 36 and 38 respectively. The said converging members are in turn fixed to the tie rod 22, positioned adjacent the forward end of the said frame. A stiffening plate 40 is secured to the said converging members 36 and 38 respectively adjacent the forward end thereof. Positioned beneath the plate is a housing or bracket 42 having a bearing 44 secured thereto. Seated in this bearing is a pin 46 having a ball connection means 48 at the end thereof. This ball connection means is received in the bearing 44 which is preferably formed as a socket thereby permitting a swivel connection. The said pin 46 is adapted to be positioned in a pair of aligned apertures 50 which are formed in a pair of plates 52.

These plates 52 form a device for attaching the frame to the conventional draw bar of the tractor. The said plates are held in spaced relation through the medium of spacers 54 and connecting links 56. The said connecting links have pins or lugs 58 secured thereto for the purpose of engaging in the conventional apertures in a conventional draw bar.

Adjacent the said tie rod 16 and at the terminal portion of each of the rods 12 and 14, there is provided a plurality of wheels, two wheels provided in each assembly. Housings 60 are supplied at the said terminal portions of the said rods 12 and 14 respectively and a shaft 62 extends therethrough. A bifurcated bracket 64 is positioned at the terminal portion of each of the said shafts 62 for the purpose of receiving an axle 66 therethrough, whereon the said wheels 68 are journaled. It will be noted that the preferable construction is and includes a pair of wheels 68 between each bifurcated bracket 64.

It is noted at this point that if found desirable diagonal or other guy wires may be utilized to serve their usual function.

Going now to Figure 5 it will be noted that there is provided on the said rods 12 and 14 respectively means for leveling the terrain.

Brackets 70 are secured to the said rods 12 and 14 and depend therefrom. Rails 72 are pivoted to the said brackets 70 and means for adjusting the said rails 72 pivotally is provided. The preferable adjusting means may be seen in Figure 5 wherein there is disclosed a stand 76 having an aperture therein for receiving a threaded shaft 78 therethrough. A wheel or other suitable equivalent 80 is received on the said shaft 78 while a bearing 81 is also received on the said shaft 78. This bearing is formed on the said rails 72 thereby permitting adjustment pivotally of the said rails in accordance with the turning of the wheel 80.

Figure 4:
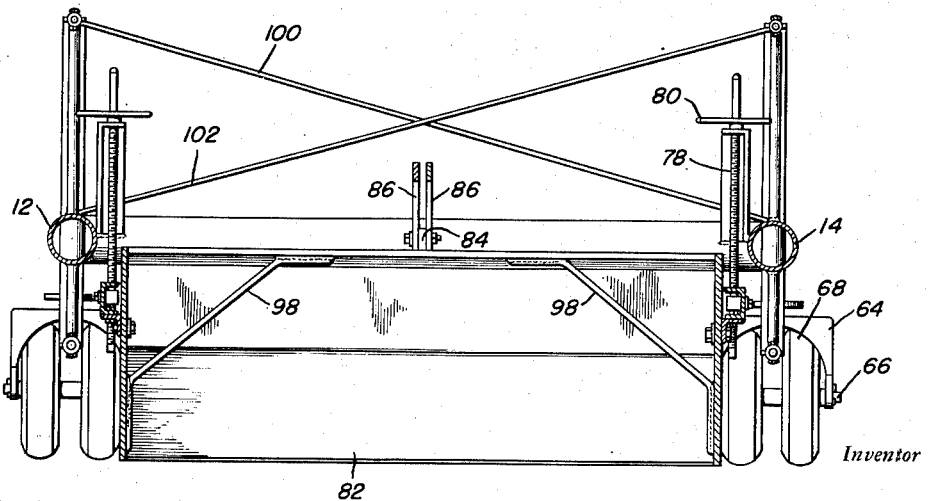
Figure 4 is a transverse sectional view of the invention shown in Figure 1 and taken substantially on the line 4—4 thereof and in the direction of the arrows.

Means for leveling and scraping land is provided. This means may be noted as the shovel or scoop or scraper 82. Arms 84 are rigidly secured to the said shovel on the back baffle portion thereof. A pitman may be seen in Figure 5 associated with the arms 84. This pitman seen at 86 has a bracket 88 rigidly secured thereto. A member is associated with the said pitman 86 and may be noted more properly as a bell crank 90. The end of the said bell crank 90 is pivoted to a stand or support 92 which is operatively associated with the said rails 72. A second bracket 94 is rigidly secured to the said bell crank 90 and resilient biasing means, preferably a spring 96 extends between the said brackets 88 and 94 opposing pivotal operation of the pitman 86 and said crank 90 and constantly urging the scraper pivotally toward the ground. This spring constantly biases the shovel means 82 in a selected position. Of course, supports may be supplied in the said shovel as noted at 98 for the obvious strengthening purposes. Also, going to Figure 4 it will be noted that diagonal struts 100 and 102 respectively may also be associated with the frame for strengthening purposes.

Having described the invention, what is claimed as new is:

1. An attachment for a tractor comprising a frame which includes a pair of side bars, tie rods secured to said bars, brackets depending from said bars and rails pivoted to said brackets, a scraper pivotally secured between said rails, means carried by said bars and operatively engaging said rails for raising and lowering said rails pivotally thereby bodily raising and lowering said scraper, means carried by said rails and secured to said scraper for pivotally operating said scraper including a support, a crank pivoted to said support, a pitman pivoted at one end to said crank and pivotally connected with said scraper, and means reacting on said pitman and said crank constantly resiliently urging said crank and said pitman pivotally with respect to each other to press said scraper toward the ground.

2. A ground leveller comprising a frame which includes a pair of side bars with tie rods extending between said bars, a pair of rails, brackets depending from said bars, each rail having one end pivoted to one of said brackets, vertically operable means carried by said bars and attached to said rails for pivotally operating the opposite ends of said rails, a scraper pivotally carried by said rails and bodily displaced when said rails are pivotally operated, a support fixed for movement with said rails, means carried by said support and operatively connected with said scraper for pivoting said scraper including a crank with a pitman connected thereto and to said scraper, and a spring reacting on said crank and said pitman constantly urging said pitman pivotally with respect to said crank thereby pressing said scraper toward the ground.

ORAL R. HEAVILIN.

REFERENCES CITED

The following references are of record in the file of this patent:

UNITED STATES PATENTS

| Number | Name | Date |
|---|---|---|
| 2,045,166 | Robinson | June 23, 1936 |
| 2,096,656 | Stoulil | Oct. 19, 1937 |
| 2,124,625 | Marvin | July 26, 1938 |
| 2,146,807 | Ferari | Feb. 14, 1939 |
| 2,160,193 | Arndt | May 30, 1939 |
| 2,407,780 | Gurries | Sept. 17, 1946 |
| 2,411,277 | Laird et al. | Nov. 19, 1946 |
| 2,428,857 | Smith | Oct. 14, 1947 |
| 2,444,977 | Clark | July 13, 1948 |
| 2,459,591 | Shumaker et al. | Jan. 18, 1949 |